United States Patent [19]

Scarlett

[11] Patent Number: 5,323,584
[45] Date of Patent: Jun. 28, 1994

[54] STRUCTURAL BEAM AND JOINT THEREFOR

[75] Inventor: John T. Scarlett, Calgary, Canada

[73] Assignee: Jager Industries Inc., Alberta, Canada

[21] Appl. No.: 967,570

[22] Filed: Oct. 28, 1992

Related U.S. Application Data

[63] Continuation of Ser. No. 769,754, Oct. 3, 1991, abandoned, which is a continuation of Ser. No. 409,086, Sep. 19, 1989.

[30] Foreign Application Priority Data

Sep. 11, 1989 [CA] Canada ................................ 610852

[51] Int. Cl.⁵ ............................ E04C 3/12; F16B 5/00
[52] U.S. Cl. .................................. 52/729; 52/730.7; 403/381
[58] Field of Search ................ 52/729, 730.1, 730.7, 52/731.1, 595, 593, 594; 403/354, 375, 381

[56] References Cited

U.S. PATENT DOCUMENTS

| | | | |
|---|---|---|---|
| 643,552 | 2/1900 | Squires | 403/381 |
| 1,377,891 | 5/1921 | Knight | 52/729 |
| 2,981,669 | 4/1961 | Brand et al. | 52/594 |
| 3,490,188 | 1/1970 | Troutner | 52/729 |
| 3,960,637 | 6/1976 | Ostrow | 52/730 |
| 4,019,298 | 4/1977 | Johnson, IV | 52/594 |
| 4,191,000 | 3/1980 | Henderson | 52/729 |
| 4,195,462 | 4/1980 | Keller et al. | 52/729 |
| 4,336,678 | 6/1982 | Peters | 52/729 |
| 4,413,459 | 11/1983 | Lambuth | 52/729 |
| 4,456,497 | 6/1984 | Eberle | 52/729 |
| 4,715,162 | 12/1987 | Brightwell | 52/729 |
| 4,967,534 | 11/1990 | Lines | 52/729 |

FOREIGN PATENT DOCUMENTS

| | | | |
|---|---|---|---|
| 1074526 | 4/1980 | Canada | 52/729 |
| 1236806 | 6/1960 | France | 403/381 |
| 978639 | 12/1964 | United Kingdom | 52/729 |

Primary Examiner—Michael Safavi
Attorney, Agent, or Firm—Nixon & Vanderhye

[57] ABSTRACT

The glued structural and joint beam of the present invention comprises a tongue formed on a longitudinal edge of a web member of the beam wherein the tongue comprises a generally bulbous or outwardly bowed profile extending from the edge to shoulders recessed into opposed faces of the web, and a groove formed on a longitudinal face of a flange member of the beam wherein the groove comprises a profile with outwardly bowed side walls configured to mate with the bulbous profile of the tongue. The joint lockingly connects the flange and web members of a wooden I-beam to inhibit disconnection of the joint during curing of the joint adhesive. Dimensional lumber or composite wooden members may be used.

15 Claims, 3 Drawing Sheets

STRUCTURAL BEAM AND JOINT THEREFOR

This is a continuation of application Ser. No. 07/766,754, filed Oct. 3, 1991, now abandoned, which is a continuation of application Ser. No. 07/409,086, filed Sep. 11, 1989, now abandoned.

BACKGROUND OF THE INVENTION

This invention relates to a novel joint construction and in particular to a structural beam construction utilizing a novel joint between the flange and web components of such beam. The beam may be of flanged construction, such as I-beam, T-beam or angles. The beam components may be dimensional lumber, composite wood, synthetic materials or any combination thereof.

It is well known in the art to manufacture composite I-beams from wooden material wherein flange or chord members are made of dimensional lumber and are joined to planar webs. The webs may be formed of dimensional lumber, but typically are formed from elongated, planar panels of plywood, particle board, waferboard, or oriented strand board. Typically in an I-beam, the dimensional lumber flanges are positioned parallel to one another with the grain extending longitudinally of the flanges. Web material is fixed between the flanges. Where plywood material is used for the web, the grain of the outer plies preferably extends parallel to the longitudinal direction of the flanges, although it is known to orient the outer plies perpendicular to the flanges. Similarly, where oriented strand board is utilized, it is optional and preferable to ensure that the grain directions of the outer layers are oriented parallel to the flanges.

Also typically in such wooden beam construction, the joints between the webs and flanges comprise tongue and groove construction, or a modification thereof. U.S. Pat. No. 1,377,891 to Knight illustrates rabbet as well as dovetail joints in a wooden I-beam. Such joints may be glued or mechanically fastened to retain the tongue within the groove. The joint constructions typically have comprised either a clearance fit, or an interference or friction fit. As a result of normal fluctuating moisture contents in wood, dimensional stability of the joint structure is difficult to ensure and tolerances must be generous. Consequently, clearance fit joints frequently are either undersized or oversized. If undersized, joint weakness results from reduced glue attachment, and if oversized, a friction fit develops with the associated problems of such construction.

Although friction fit jointed wooden I-beams have achieved significant commercial acceptance typically as joist or truss members, there are certain manufacturing and application problems associated with them. In friction fit joints, a tongue structure may be formed on the edge of the web, which then may be inserted into a groove structure formed longitudinally within the flange member. A unitary tongue member may be inserted straight into a matching groove, for either a clearance or interference fit. Alternative designs include bifurcated or parallel tongue members which may be forced into cooperating groove means so that the legs of the tongue are biased or flexed inwardly towards each other or outwardly away from each other. In all such cases, a degree of compression is applied laterally to the tongue members.

For example, U.S. Pat. No. 4,191,000 to Henderson discloses a joint with a specially milled bifurcated tongue inserted into a mating bifurcated groove. U.S. Pat. No. 4,456,497 to Eberle discloses a joint where the parallel legs of a tongue are squeezed together in a tapered groove. U.S. Pat. No. 4,195,462 to Keller discloses a joint where paired parallel legs of a tongue are flexed apart upon insertion into paired inclined grooves.

In the usual case where glues are utilized as the adhesion means between the web and the flange, the frictional interfitting of tongues and grooves results in scraping of the joint surfaces and removal of the glue over a greater or lesser extent of the surfaces of the joint. Such removal results in glue starvation and ultimate weakness of the joint connection.

This problem has been made recognized in the past, and attempts have been to overcome the problem by providing specially designed surfaces to reduce glue removal and allow it to flow within the joint area. U.S. Pat. No. 4,336,678 to Peters discloses a scalloped or dimpled surface on the lateral edges on the tongue of the web to vent the glue line and permit more even application of glue. Similarly, U.S. Pat. No. 4,715,162 to Brightwell discloses a tapered tongue on a web member, wherein glue slots are provided.

A further manufacturing problem associated with friction fit joints is the tendency of such joints to disconnect or separate during the assembly and adhesive curing stages of manufacture. Where compressive forces are required to insert the tongue into the groove of the joint, it has been recognized that the glue may act as a lubricant, thereby reducing the frictional adhesion between mating surfaces of the joint and facilitating separation of the joint unless great care is taken to clamp or otherwise retain the I-beam components in position during the curing stage. This additional requirement increases the cost and complexity of manufacture and assembly of wood I-beams. U.S. Pat. No. 4,191,000 to Henderson discloses the use of a nailed assembly to retain the integrity of the joint during the glue curing stage.

Frictional joints also create a lateral or transverse cupping effect in the longitudinal flanges which results in undesirable application and aesthetic problems. The transverse pressures in a wooden flange resulting from the frictional compression at the joint interface will result in spreading of the inner flange surfaces adjacent the web relative to the outer flange surfaces opposite the web. This unequal expansion generates a bow or cup in the flange. The cupping effect may be exacerbated by further expansion of the wood fibres adjacent the joint in consequence of absorption of moisture from the liquid glues typically used in the manufacture of wooden components. Such cupping of the flange may result in twisting and instability of the beam, undistributed loading in application, and basic cosmetic degradation.

Still a further problem associated with flanged beams manufactured from dimensional or sawn lumber is the unevenness of surfaces and dimensional irregularities such as warps, cupping and bows. In contrast, manmade composite materials such as plywood, particle board, waferboard, laminated veneer lumber (LVL) and structural composite lumber have more consistent dimensional parameters. The joint of the present invention is particularly well suited to sawn lumber flanges.

SUMMARY OF THE INVENTION

The present invention provides a novel joint construction for an I-beam or similar structures which may comprise elongated wooden chords and generally planar web members in which the width of the chord is greater than the thickness of the web. The joint comprises a tongue formed at a longitudinal edge of the web and a groove formed in a longitudinal face of the chord, wherein the tongue comprises a generally bulbous profile or cross-section extending from said edge to shoulders recessed into opposed faces of said web, and wherein the groove comprises a complementary profile with outwardly bowed side walls configured to mate with said bulbous profile. By "complementary", it is meant a surface of one member which mates with the cooperating surface of the other member in a generally uncompressed or relaxed joint configuration, thereby achieving a "self-locking" arrangement. The tongue may be centrally bifurcated to cooperate with a complementary spline upstanding centrally from the base of the groove.

A further embodiment of the invention provides a wooden structural load bearing member comprising at least one elongated chord member and a web member connected to the chord member by means of a tongue and groove joint, the joint comprising tongue means disposed in a longitudinal groove in said chord member; the groove comprising outwardly bowed side walls; the tongue comprising opposed bulbous surfaces extending from said edge to shoulders recessed into opposed faces of said web member, having a maximum thickness generally equal to the thickness of the web.

It is an object of the present invention to overcome or substantially minimize the aforementioned deleterious effects of friction fit joints by providing a joint which is self-locking when assembled.

Another object of the present invention is to provide a joint with improved spreading and uniformity of glue distribution and which minimizes glue starvation resulting from contact between joint surfaces during assembly.

It is a further object of the invention to produce a generally uncompressed joint which minimizes compressive forces within the joint structure which produce cupping in flanges. The complementary surfaces of the cooperating members of the joint substantially eliminate lateral compressive forces within the assembled joint.

Still another object of the invention is to achieve a joint which does not require independent clamping or other retention means during curing of the glue or adhesive.

It is a further object of the invention to achieve a joint construction which has a reduced tendency to disconnect or separate in consequence of the lubrication effect of the adhesive during the natural torsional or twisting loads imposed on the beam and its components during assembly.

Further and other advantages of the invention will be apparent from the following description.

BRIEF DESCRIPTION OF THE DRAWINGS

As far as practical, the same elements or parts which appear in the different views of the drawings will be identified by the same reference number.

DESCRIPTION OF THE PREFERRED EMBODIMENTS

Figure 1:
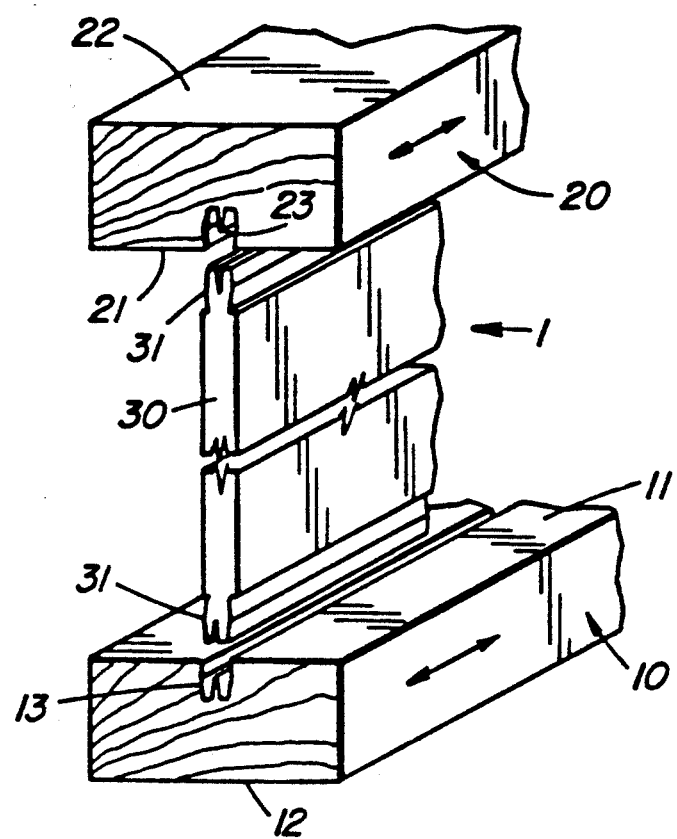
FIG. 1 is a perspective view showing web and flange members used to fabricate a wooden I-beam according to the present invention.

With reference to FIG. 1, the component members of an I-beam utilizing the joint construction of the present invention may be seen. The beam 1 comprises a lower chord 10, a parallel upper chord 20 and a web member 30 extending between the chords. Lower chord 10 is manufactured from dimensional lumber, laminated veneer lumber (LVL) or structural composite lumber, typically such as 2"×4" or 2"×3" lumber, although other can be used depending upon the application. Chord 10 has an inner face 11 which is oriented towards the central axis of the beam, and an outer face 12 which is oriented away from the central axis of the beam. A groove 13 is formed longitudinally and centrally into face 11 in the manner hereinafter described.

The grain orientation within the lumber of each of upper and lower chords 10 and 20 is illustrated by double headed arrows.

Figure 3:
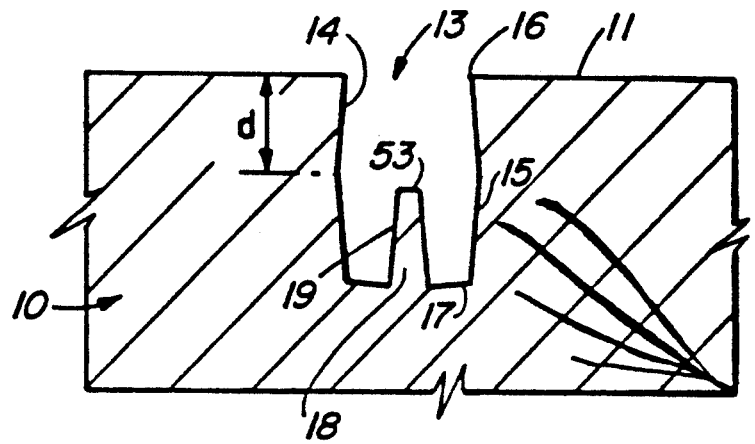
FIG. 3 is a partial cross-sectional view of the groove portion of the joint of the present invention.

As may be seen from FIG. 3, a groove 13 is cut into surface 11 of chord 10. Groove 13 is defined by outwardly curved side walls, such that the distance between the walls is greatest at an intermediate height of the groove. In the particular embodiment, groove 13 has biplanar side walls having first planar section 14 and second planar section 15. The upper edges of wall sections 14 intersect the surface 11 at edges 16, and create a portion of the groove 13 undercutting edges 16, while side walls 15 are reversely inclined from walls 14 and taper together towards the base 17 of groove 13. Side wall portions 14 and 15 are of generally equal vertical extent, and consequently the widest point between the outwardly bowed side walls is generally at the mid-height of the groove 13.

A longitudinal spline 18 extends upwardly from the base 17 of the groove, and defines spline side walls 19.

Similarly, upper chord or flange 20 has an inner face 21 and outer face 22, with a groove 23 formed in face 21. Groove 23 has corresponding biplanar side walls and central spline.

Web member 30 comprises a generally planar panel, which may be whole lumber, but is more likely selected from manufactured panels such as plywood, particle board, waferboard or oriented strand board (OSB). The web member has an appendage or tongue 31 formed along each longitudinal edge adjacent the respective chord member.

Figure 2:
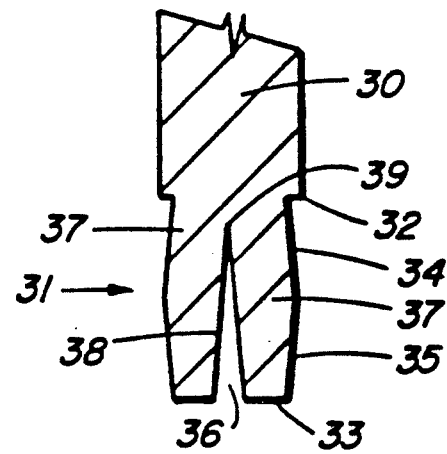
FIG. 2 is a cross-sectional view of the tongue portion of the web of a joint of the invention.

As may be seen from FIG. 2, tongue 31 is incised on each of the opposed planar faces of the web 30. Tongue 31 has a generally bulbous configuration having a maximum thickness generally equal to the thickness of the web. The tongue tapers bi-directionally toward incised shoulders 32 and towards peripheral edge 33 thereby creating respective planar surfaces 34 and 35.

A tapered slot 36 is formed into peripheral edge 33, thereby bifurcating the tongue into paired legs 37. This slot 36 is defined by side walls 38 and terminus 39.

Figure 4:
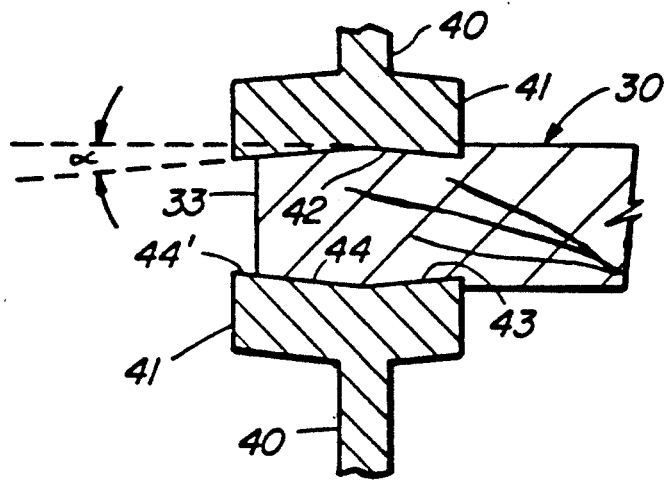
FIG. 4 illustrates the first step of the method of generating a tongue on the web as contemplated by the invention.

The profile of tongue 31 is formed on each longitudinal peripheral edge of web 30 by a milling or machining device. As may be seen from FIGS. 4 and 5, a two step sequence is employed to form the necessary profile. The first machining operation illustrated in FIG. 4 utilizes a pair of opposed blades 40 (which rotate in a plane perpendicular to the plane of the Figure). Each of blades 40 has a dado type or extended tooth cutter head 41 with a generally inwardly angled cutting edge 42. Although edge 42 may be of an arcuate shape, it is preferred that the edge be V-shaped with each half 43 and 44 inclined at an angle $\alpha$ from the plane of the web 30 but with a reverse inclination from the other half. Tongue surfaces 34 and 35 are cut on to opposed faces of the web 30 by the paired opposed edges 43 and 44 of blades 40. Face 44 may have a portion 45 which extends beyond the peripheral edge 33 of web 30 to assure full tapering of surfaces 35.

Figure 5:
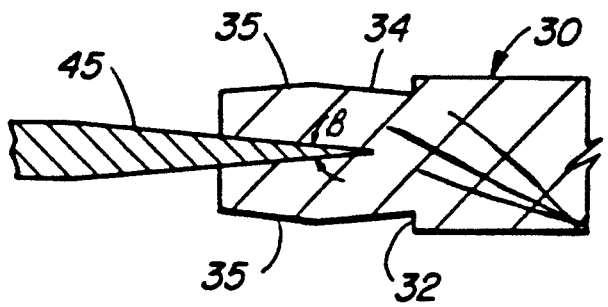
FIG. 5 illustrates the second step of the method of generating a tongue on the web as contemplated by the invention.

As may be seen in FIG. 5, a second machining operation utilizes a slotting blade 45 which is tapered to the angle $\beta$ of slot 36. Angle $\beta$ is equal to twice angle $\alpha$. The complete tongue preferably is cut for each edge of the web in a single pass through the combination of saws.

Figure 6:
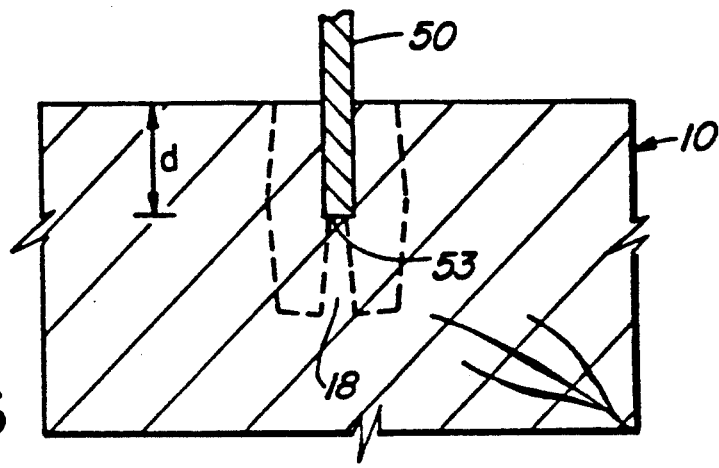
FIG. 6 illustrates the method of generating a portion of the groove in the flange as contemplated by the invention.
Figure 7:
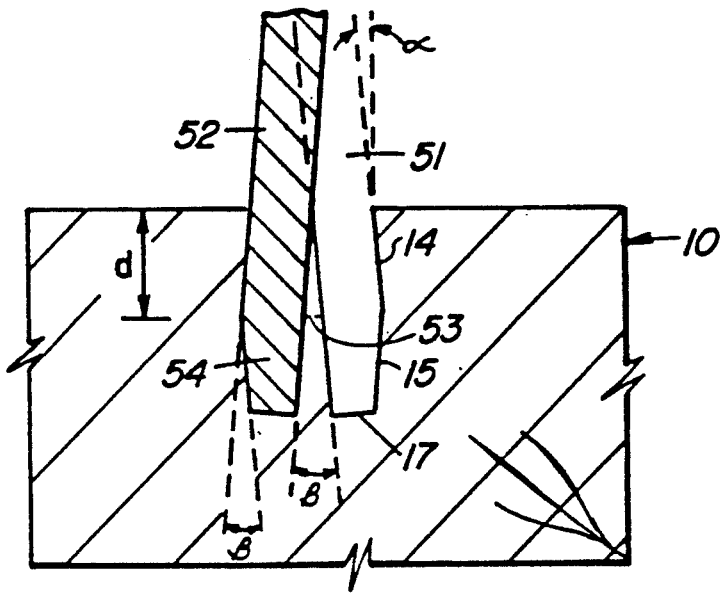
FIG. 7 illustrates the method of generating the remainder of the groove in the flange as contemplated by the invention.

As may be seen from FIGS. 6 and 7, groove 13 is formed in chord 10 by consecutive parallel longitudinal cutting operations which create a profile complementary to that of tongue 31. The specially shaped cavity of groove 13 is achieved by the sequential use of a saw blade 50 and of specially shaped rotary saw blades 51 and 52.

Where a blunt tip 53 is preferred on spline 18, it can be formed prior to the formation of the groove 13, or subsequently thereto. As may be seen in FIG. 6, a saw cut may be made to the depth 'd' of tip 53 in the chord 10 by rotary saw blade 50. Preferably, this cut is made prior to formation of the remainder of the groove 13 as illustrated in phantom in FIG. 6, although it can be made as a subsequent step by the removal of the tip 53 after formation of the full groove 13, as shown in phantom in FIG. 7. The remainder of groove 13 is formed by the use of rotary saw blades 51 and 52 which are opposed and inclined from the vertical by angle $\alpha$. Blades 51 and 52 have specially chamfered tips 54, 30 whereby the degree of chamfer is angle $\beta$ which is equal to twice angle $\alpha$.

The maximum width of tongue 31 generally corresponds to the maximum width of the groove 13. Likewise, the inclination of side wall portion 14 of groove 13 corresponds with the inclination of planar side wall 34 of tongue 32. Each is $\alpha°$ from the vertical. Similarly, the inclination of groove side wall portion 15 corresponds with the inclination of tongue side wall 35.

The tapered side walls 19 of central spline 18 subtend an angle $\beta$ equal to twice angle $\alpha$, and correspond in inclination with tapered side walls 38 of central slot 36 of the tongue 31.

In the manufacture of an I-beam or similar structural member from assembled flange and web components utilizing the tongue and groove joint of the present invention, a suitable adhesive such as CASCOPHEN LT-75* (a phenol resorcinol adhesive) manufactured by Borden Chemical Western, a division of the Borden Company Ltd., is applied within groove 13 of the chord 10 by a nozzle means which spreads the adhesive over all surfaces of the groove. A machine with a tapered series of steel rollers may be used to apply pressure to bottom and top flange surfaces 12 and 22 so as to force the flange and web components together, and the tongue 31 into the groove 13 as the beam components are advanced through the machine. Alternative means to apply pressure to the web and flange members may include hydraulic ram means.

* trade mark

Figure 8:
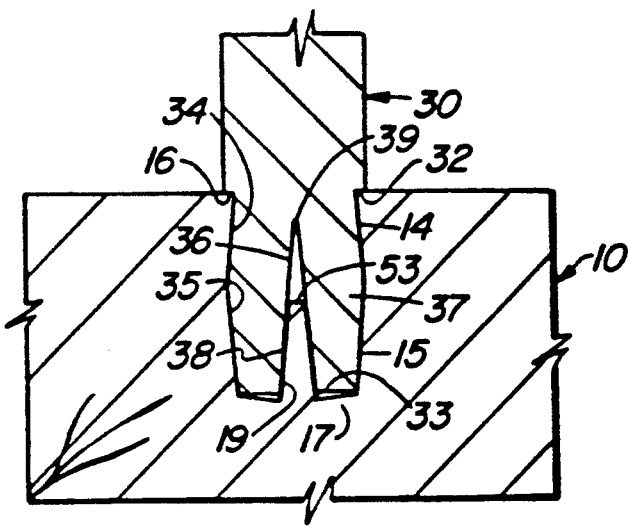
FIG. 8 shows the completed joint construction of the present invention.

During fabrication of the joint by insertion of the tongues 31 into grooves 13 and 23, the respective legs 37 of the tongue 31 are biased or forced towards each other against the peripheral edges 16 of the groove 13 until the widest point of the tongue is within the groove. Thereafter, and during continued insertion, the legs of original orientation. As may be seen in FIG. 8, restoration of the legs 37 to their unbiased orientation may be aided by spline 18 cooperating with side walls 38 of slot 36. The precise machining of the respective tongue and groove surfaces must provide for sufficient clearance to permit sufficient glue dispersal and adhesion between the surfaces. Excess glue may be transmitted by the pressure of the closed joint into a pocket formed between the tip 53 of spline 18 and the terminus 39 of slot 36 as well as in two pockets formed between groove bases 17 and tongue edges 33, as may be seen in FIG. 8.

As will be readily apparent, the design of joint hereinbefore described is self-locking inasmuch as each member is in a generally non-stressed or non-deflected condition when the joint has been fully assembled, and the joint cannot be separated thereafter without the application of force. This is in contrast to prior joint designs in which the tongue member remains under compression or biased out of position in the assembled joint, which may precipitate or permit separation or disconnection of the joint surfaces.

Example

In a preferred embodiment on the joint, the inclination $\alpha$ of surfaces 14, 15, and 19 and corresponding surfaces 34, 35 and 38 is 5° from the central plane of the web 30. This requires that opposed milling blades 40 have cutter faces 43 and 44 oppositely inclined 5° from the plane of the web, and that the slotting blade 45 is tapered to internal angle $\beta$ of 10°. Similarly, the groove cutting blades 51 and 52 are inclined at 5° from the plane of the groove and have tips 54 chamfered at 10° from the plane of the blades.

A groove having a widest extent of 0.378" and a depth of 0.55" with a spline of 0.26" height (d=0.29") has been found satisfactory with a tongue formed in ⅜" web material having a maximum width of 0.36" and a depth of 0.54". In such a case, the tongue 31 slips unimpeded into the groove 13 with a 0.029" clearance to a depth of 0.162" at which time the tongue 31 makes contact with the top edges 16 of the flange groove 13. The flange material is temporarily compressed, and the legs 37 converged, thereby allowing the tongue 31 to pass through into the groove 13. As the tongue is mechanically fully inserted into the groove, the 0.26" high spline 18 at the bottom of the groove separates the two legs 37 of the tongue forcing them outwards, tightly against the sides walls 14 and 15 of the groove. This maintains a tight, positive mechanical lock, pressuring the adhesive over the joint surfaces. Any excess adhesive may be squeezed into a pocket formed in slot 36 between terminus 39 and spline tip 53. This mechanical interaction of the bowed tongue and groove surfaces retains the joint in a locked condition during adhesive curing.

As will be understood by a person skilled in the relevant art, wood products are susceptible to dimensional change with variations of the moisture content of the wood. Also, mechanical cutting devices are subject to change in dimension from heat and wear. Thus, although the preferred form of the invention results in a finished joint in which the legs 37 are not laterally deflected, and with a fine glue line between mating surfaces of the joint, it will be understood that variations in dimensions may result in some lateral deflection of the legs 37, without departing from the desired mechanical locking effect of the joint or the maximized surface contact in the joint which results in a fine glue line.

It will also be understood that part or all of the joint components may be formed from non-wooden materials, including plastics and metals.

The terms and expressions which have been employed in the foregoing specification are used therein as terms of description and not of limitation, and there is no intention in the use of such terms and expressions to exclude equivalents of the features shown or described, it being recognized that the scope of the invention is defined and limited only by the claims which follow.

I claim:

1. An elongated wooden structural load bearing member comprising at least one elongated chord member and an elongated planar web member connected to said at least one chord member by means of an uncompressed tongue and groove joint, the joint comprising tongue means matingly disposed and adhesively secured in a longitudinal groove in said chord member, the groove comprising outwardly bowed side walls, and the tongue comprising opposed bulbous surfaces extending from a peripheral edge to shoulders recessed into opposed faces of said web member which surfaces conform to said side walls, the tongue having a maximum thickness generally equal to the thickness of the web member, wherein a tapered spline located generally centrally of said groove protrudes from a base of said groove, and wherein said peripheral edge includes a longitudinal slot centrally located on said peripheral edge which is tapered to cooperate with said spline, and further wherein the depth of the slot is generally equal to the depth of the tongue and exceeds the height of the spline.

2. The structural member of claim 1, wherein the side walls of the groove are biplanar, and inclined outwardly from the top and bottom edges thereof, and wherein the tongue has biplanar lateral surfaces which taper outwardly towards each other from said shoulder and said edge.

3. The structural member of claim 1 wherein a glue receiving pocket is formed at the apex of the slot.

4. The structural member of claim 1 wherein the groove has a depth which marginally exceeds the inserted length of the tongue to define a glue receiving pocket.

5. An uncompressed, elongated joint construction adapted for use in composite wooden I-Beams having elongated chord and generally planar web members, the joint comprising a tongue formed at a longitudinal edge of the web adhesively secured in a groove formed in a longitudinal face of the chord, wherein the tongue comprises a generally bulbous profile extending from said edge to shoulders recessed into opposed faces of said web, the profile having a maximum thickness generally equal to the thickness of the web, wherein the groove comprises a profile with outwardly bowed side walls pre-configured to mate with said bulbous profile, and wherein the groove includes a central spline upstanding in the groove, and said tongue has a tapered central slot.

6. The uncompressed joint of claim 5, wherein the side walls of the groove are biplanar and inclined outwardly from the top and bottom edges thereof, and the tongue has biplanar lateral surfaces which taper outwardly towards each other from said shoulder and said edge.

7. The joint of claim 6, wherein the central spline is truncated.

8. The joint of claim 7, wherein said chord member is dimensional lumber, laminated veneer lumber or structural composite lumber.

9. The joint of claim 7, wherein said web member is plywood, particle board or waferboard.

10. The joint of claim 7 wherein the groove has a depth which exceeds the inserted length of the tongue, defining an internal void in the joint adapted to receive excess glue displaced during joint assembly.

11. The joint of claim 7 wherein a glue receiving pocket is formed at the apex of the slot.

12. A self-locking, uncompressed gluable joint construction for two elongated wooden elements comprising a longitudinal tongue member and associated complementary groove wherein the tongue member on one element comprises an elongated body having opposed side walls, and a tapered, central longitudinal slot, said side walls having first divergent portions and second convergent portions whereby the maximum thickness of the tongue member corresponds generally to the thickness of the one element, and wherein said groove in the other elongated element is defined by side walls a base with a central upstanding tapered spline, said groove side walls having first divergent portions and second convergent portions, wherein the first and second portions of the side walls and the slot of said tongue member are confined to conform to said walls and spline of said groove.

13. The joint construction of claim 12 wherein the central spline is truncated to form a glue receiving pocket at the apex of the slot.

14. The joint construction of claim 12 wherein the groove has a depth which exceeds the inserted length of the tongue, defining an internal void in the joint adapted to receive excess glue displaced during assembly.

15. The joint construction of claim 12 wherein the groove has a depth which marginally exceeds the inserted length of the tongue to define a glue receiving pocket.

* * * * *